C. PEARSON.
FORE CARRIAGE FOR HAY RAKES.
APPLICATION FILED JUNE 15, 1911.

1,005,066.

Patented Oct. 3, 1911.

3 SHEETS—SHEET 1.

Witnesses:
C. C. Palmer.
F. W. Hoffmeister.

Inventor.
Charles Pearson
By E. W. Burges
Attorney.

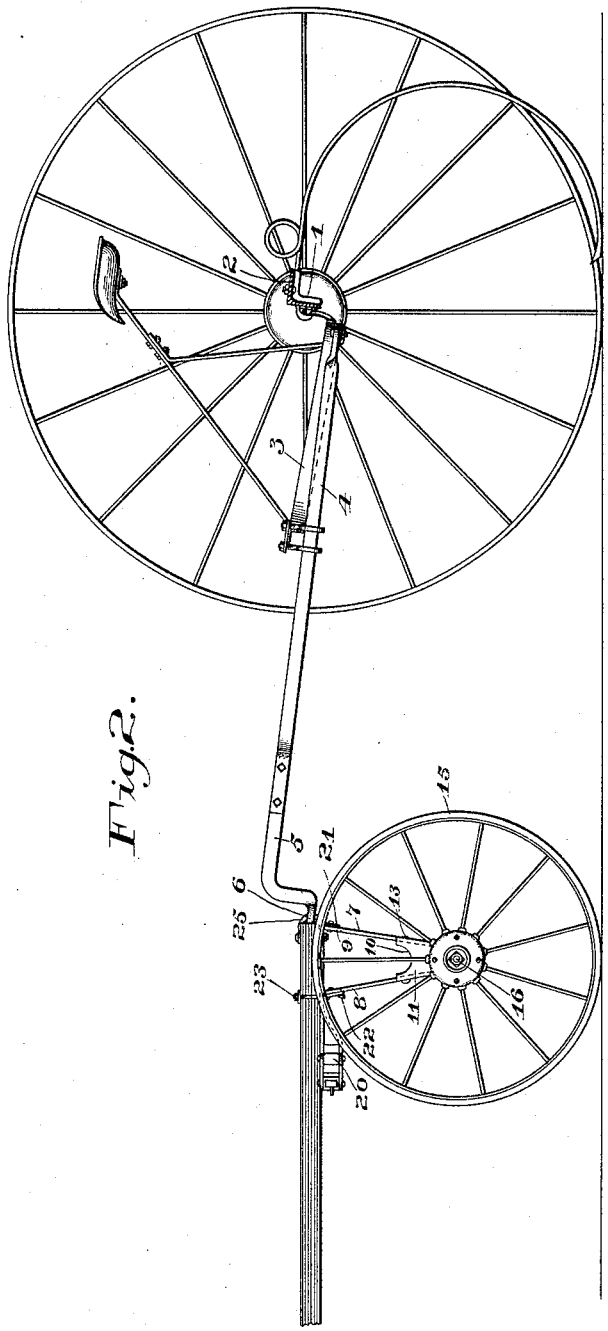

C. PEARSON.
FORE CARRIAGE FOR HAY RAKES.
APPLICATION FILED JUNE 15, 1911.
1,005,066.
Patented Oct. 3, 1911.
3 SHEETS—SHEET 3.
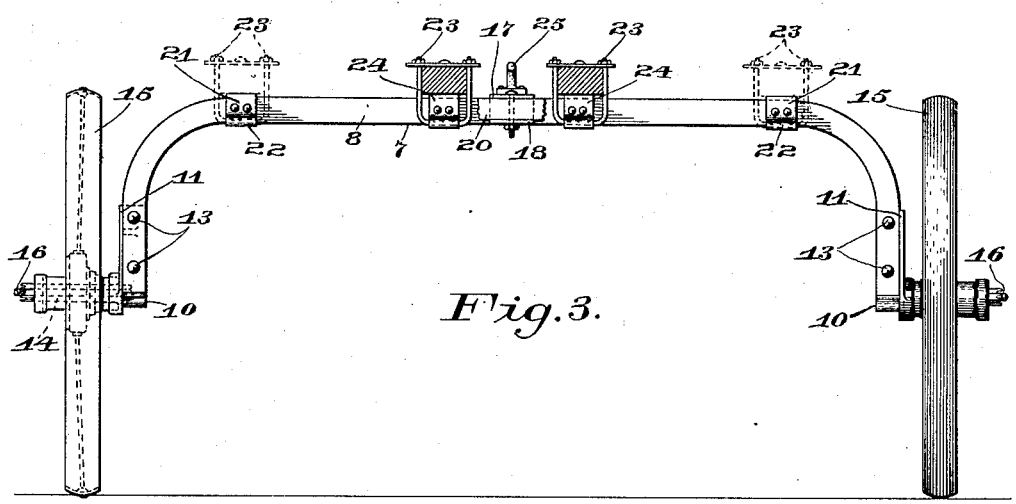
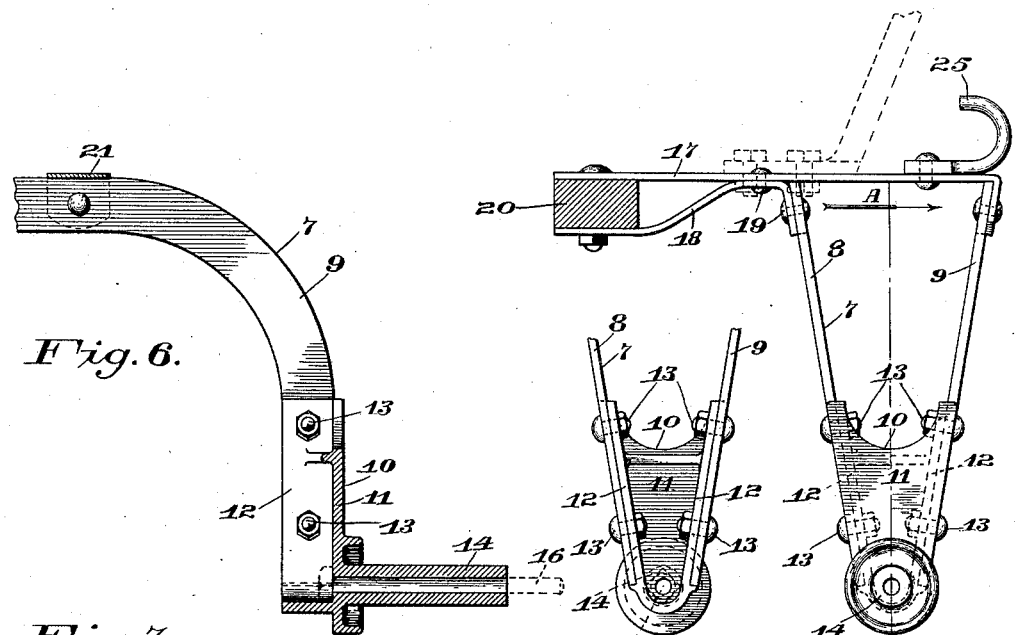
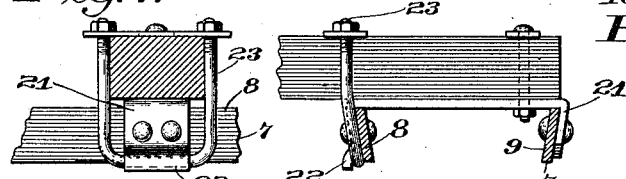
Witnesses:
C. C. Palmer.
F. W. Hoffmeister.
Inventor.
Charles Pearson.
By E. W. Burgess
Attorney.

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

FORE-CARRIAGE FOR HAY-RAKES.

1,005,066. Specification of Letters Patent. Patented Oct. 3, 1911.

Application filed June 15, 1911. Serial No. 633,315.

*To all whom it may concern:*

Be it known that I, CHARLES PEARSON, a citizen of the United States, residing at Chicago, in the county of Cook and State of Illinois, have invented certain new and useful Improvements in Fore-Carriages for Hay-Rakes, of which the following is a specification.

My invention relates to forecarriages, and in particular to an attachment of the class indicated that is adapted to be connected with the draft frame of a hay rake; the object of my invention being to provide a construction of forecarriage that is strong and simple, one that may be readily attached to or detached from a hay rake, and one wherein the thills or tongue of a hay rake may be utilized for a like purpose in connection with the forecarriage. I attain these objects by means of the mechanism illustrated by the accompanying drawings; in which—

Figure 1:
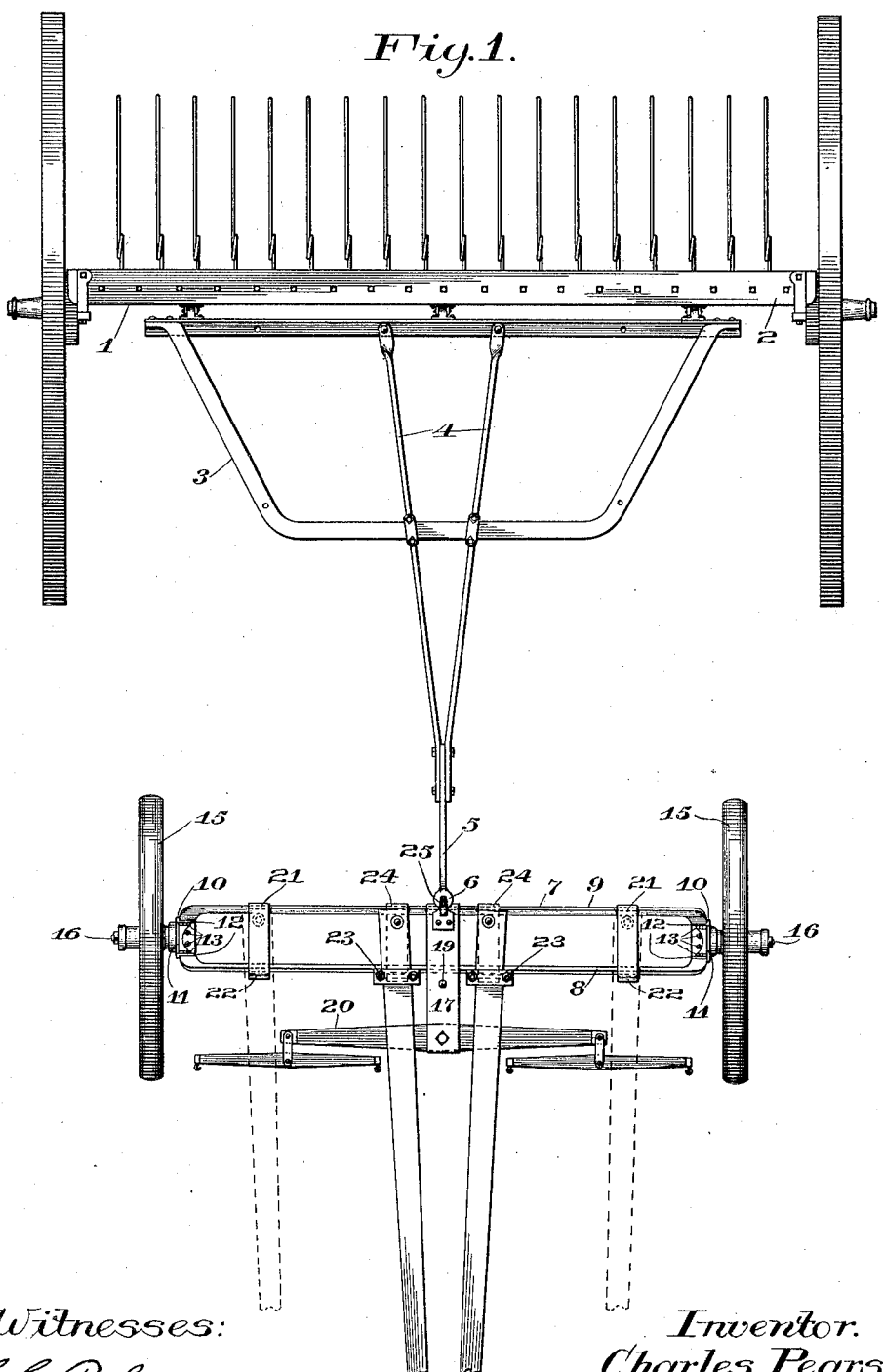
Figure 1:

Figure 1 is a top plan view of my improved forecarriage and hay rake, designed to illustrate the manner of connecting one with the other, and the means whereby the draft thills of a hay rake may be utilized for a like purpose in connection with a forecarriage; Fig. 2 is a side elevation of Fig. 1; Fig. 3 is a front elevation of the forecarriage; Fig. 4 is an end elevation of the frame of the forecarriage; Fig. 5 is a rear view of part of Fig. 4; Fig. 6 is a detached detail, partly in section, and representing a vertical section along line A—B; Fig. 7 is a detail showing the means whereby the thills of the hay rake are secured to the frame of the forecarriage; and Fig. 8 is a side elevation of Fig. 7.

The same reference characters designate like parts throughout the several views.

1 represents a common form of hay rake including a head 2 and a draft frame 3 pivotally connected with said head, and 4 represents draft members having their rear diverging ends secured to the draft frame and their front ends to a supplemental draft member 5 that is turned downward at its forward end and provided with an eye 6.

7 represents a forecarriage including front and rear transversely arranged inverted U-shaped frame members 8 and 9, respectively, having their upper head portions spaced apart and the legs at opposite ends thereof inclined downward and inward toward each other and secured to axle brackets 10, said brackets including a plate member 11, having inwardly projecting flat web members 12, to which are secured the lower ends of the converging legs of the frame members 8 and 9 by means of bolts 13, and outwardly projecting tubular stub axle members 14, upon which are journaled wheels 15 that are secured thereon by means of bolts 16 received by the axial openings in the stub axles.

17 represents a draft member having its rear end turned downward and secured to the central portion of the head of frame member 9, and its middle portion to frame member 8 by means of a supplemental draft strap 18 and rivets 19, the members 17 and 18 extending forward of the frame member 8 and provided with vertical openings whereby a draft evener 20 may be connected therewith.

21 represents plates that have their rear ends turned downward like the rear end of member 17 and secured in the same manner to frame member 9, having their forward ends turned downward and secured to the frame member 8, the ends of their turned down portions being turned away from the bar 8 in a manner to form a hooked portion 22 adapted to receive the head of a U-shaped bolt 23 whereby the thills may be secured to the frame of the forecarriage. The plates 21 are secured to the head of the forecarriage, near its opposite ends, and serve the double purpose of truss members and means whereby the thills may be secured to the frame when it is desired to arrange them to permit the use of one draft animal.

24 represents truss plates secured to the middle portion of the frame members 8 and 9, upon opposite sides of the draft member 17 in the same manner as plates 21, that afford means whereby the thill members may be attached to the frame of the forecarriage in a manner permitting the use of two draft animals.

25 represents a draft hook secured to the rear end of draft member 17 and adapted to be received by the eye 6 of the draft member 5 of the hay rake.

What I claim as my invention, and desire to secure by Letters Patent, is:

1. A forecarriage for implements including, in combination, two inverted U-shaped transversely arranged frame members, having their head portions spaced apart and their leg portions inclined inward, downward and toward each other, brackets secured to the lower ends of said leg portions, stub axle members integral with said brackets, a longitudinally arranged draft plate secured to the heads of said frame members at their middle portion, and means whereby an implement may be connected with the rear end of said draft plate and a draft evener with the front end thereof.

2. A forecarriage for implements including, in combination, two inverted U-shaped transversely arranged frame members, having their head portions spaced apart and their leg portions inclined inward, downward and toward each other, brackets secured to the lower ends of said leg portions, stub axle members integral with said brackets, a longitudinally arranged draft plate secured to the heads of said frame members at their middle portion, means whereby an implement may be connected with the rear end of said draft plate and a draft evener with the front end thereof, and supplemental truss plates secured to said frame members upon opposite sides of said draft plate, said draft tongue members having their rear ends secured to said supplemental plates.

CHARLES PEARSON.

Witnesses:
 RAY PATTISON,
 FRANK A. ZABILKA.

---

Copies of this patent may be obtained for five cents each, by addressing the "Commissioner of Patents, Washington, D. C."